US012064967B2

(12) United States Patent
Mikoshiba et al.

(10) Patent No.: US 12,064,967 B2
(45) Date of Patent: Aug. 20, 2024

(54) LIQUID EJECTING HEAD AND LIQUID EJECTING APPARATUS

(71) Applicant: SEIKO EPSON CORPORATION, Tokyo (JP)

(72) Inventors: Masanori Mikoshiba, Shimosuwa (JP); Motoki Takabe, Shiojiri (JP); Yasuhiro Itayama, Kai (JP); Jingling Wang, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 70 days.

(21) Appl. No.: 17/860,182

(22) Filed: Jul. 8, 2022

(65) Prior Publication Data

US 2023/0011057 A1 Jan. 12, 2023

(30) Foreign Application Priority Data

Jul. 9, 2021 (JP) ................................ 2021-114060

(51) Int. Cl.
*B41J 2/14* (2006.01)

(52) U.S. Cl.
CPC ................................ *B41J 2/14233* (2013.01)

(58) Field of Classification Search
None
See application file for complete search history.

(56) References Cited

U.S. PATENT DOCUMENTS

2008/0018204 A1 1/2008 Sugahara
2009/0053402 A1* 2/2009 Sekiguchi ............ B41J 2/14233 427/100
2010/0074459 A1* 3/2010 Chung .................. H04R 17/00 216/17
2015/0224771 A1* 8/2015 Hirai .................... B41J 2/14274 347/70

FOREIGN PATENT DOCUMENTS

JP 2008-044355 A 2/2008

* cited by examiner

*Primary Examiner* — Erica S Lin
(74) *Attorney, Agent, or Firm* — Harness, Dickey & Pierce, P.L.C.

(57) ABSTRACT

A liquid ejecting head in which a first electrode layer, a piezoelectric layer, and a second electrode layer of a piezoelectric element are laminated, a pressure chamber, which is partitioned by a partition wall, has an elongated shape, in a structure including the diaphragm and the piezoelectric element including an active portion and a non-active portion lateral direction, a first position is a position on an inner side of the active portion when viewed in the thickness direction, a second position is a position on an inner side of the non-active portion and closest to a boundary between the pressure chamber and the partition wall, and EI1/EI2≤40, wherein EI1 is a bending rigidity of the active portion at the first position and EI2 is a bending rigidity of the non-active portion at the second position.

16 Claims, 12 Drawing Sheets

LIQUID EJECTING HEAD AND LIQUID EJECTING APPARATUS

The present application is based on, and claims priority from JP Application Serial Number 2021-114060, filed Jul. 9, 2021, the disclosure of which is hereby incorporated by reference herein in its entirety.

BACKGROUND

1. Technical Field

The present disclosure relates to a liquid ejecting head and a liquid ejecting apparatus.

2. Related Art

In a liquid ejecting apparatus, typically a piezoelectric ink jet printer, a first electrode layer, a piezoelectric layer, and a second electrode layer are laminated in this order on a diaphragm, as described in for example JP-A-2008-44355.

For liquid ejecting apparatuses, there is a demand for further improvement in the reliability to prevent damages such as cracks in the diaphragm regardless of long-term use.

SUMMARY

According to an aspect of the present disclosure, in order to solve the above-described issue, a liquid ejecting head includes a diaphragm including a first surface and a second surface opposite to the first surface, a piezoelectric element disposed on the first surface, and a partition wall disposed on the second surface to partition a pressure chamber communicating with a nozzle, wherein the piezoelectric element includes a first electrode layer, a piezoelectric layer, and a second electrode layer, the first electrode layer, the piezoelectric layer, and the second electrode layer are laminated in this order on the first surface, the pressure chamber has an elongated shape when viewed in a thickness direction of the diaphragm, in a structure including the diaphragm and the piezoelectric element, an active portion is a portion where the pressure chamber, the first electrode layer, the piezoelectric layer, and the second electrode layer are all overlapped when viewed in the thickness direction of the diaphragm, in the structure, a non-active portion is a portion that is overlapped with the pressure chamber at a position different from the active portion and that is adjacent to the active portion in a lateral direction of the pressure chamber when viewed in the thickness direction of the diaphragm, a first position is a position on an inner side of the active portion when viewed in the thickness direction of the diaphragm, a second position is a position on an inner side of the non-active portion and closest to a boundary between the pressure chamber and the partition wall when viewed in the thickness direction of the diaphragm, and $EI1/EI2 \leq 40$, wherein EI1 is a bending rigidity of the active portion at the first position and EI2 is a bending rigidity of the non-active portion at the second position.

The liquid ejecting apparatus according to an aspect of the present disclosure includes a liquid ejecting head according to the above-described aspect and a controller that controls driving of the liquid ejecting head.

DESCRIPTION OF EXEMPLARY EMBODIMENTS

Figure 1:
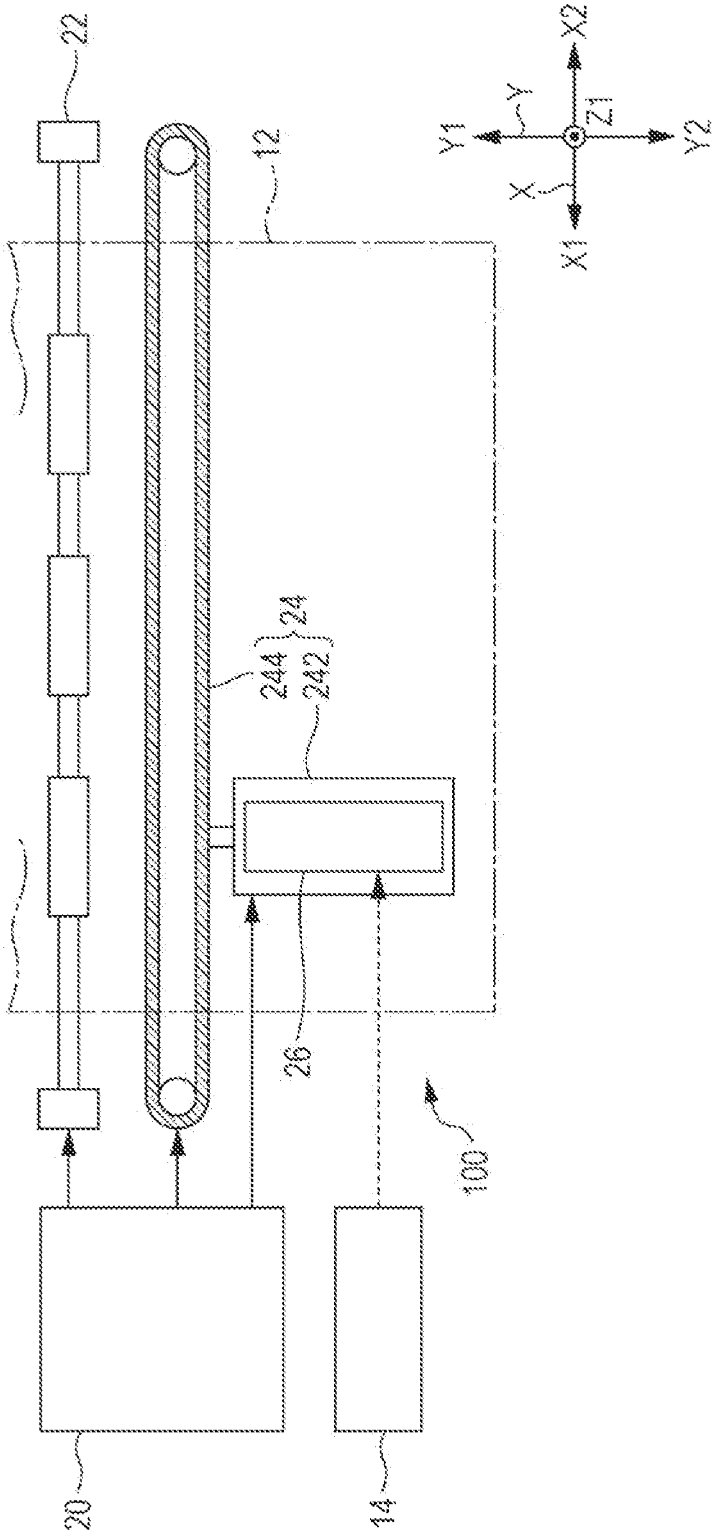
FIG. 1 is a configuration diagram schematically illustrating a liquid ejecting apparatus according to a first embodiment.

Preferred embodiments according to the present disclosure will be described below with reference to the accompanying drawings. In the drawings, the dimension and scale of each section are different from the actual ones as appropriate, and some sections are schematically illustrated to facilitate understanding. The scope of the present disclosure is not limited to these embodiments unless the present disclosure is particularly limited in the following description.

The following description uses an λ axis, a Y axis, and a Z axis that intersect each other as appropriate. In the following description, one direction along the λ axis is an λ1 direction, and the direction opposite to the λ1 direction is an λ2 direction. Similarly, the directions opposite to each other along the Y axis are a Y1 direction and a Y2 direction. The directions opposite to each other along the Z axis are a Z1 direction and a Z2 direction. The view in the direction along the Z axis may be referred to as "plan view".

Here, typically, the Z axis is a vertical axis, and the Z2 direction corresponds to a downward direction in the vertical direction. The Z axis may be rather than a vertical axis. The λ axis, the Y axis, and the Z axis are typically orthogonal to each other, but are not limited thereto, and may intersect each other at an angle within the range, for example, from 80° or more to 100° or less.

1. Embodiment

1-1. Overall Configuration of Liquid Ejecting Apparatus

FIG. 1 is a configuration diagram schematically illustrating a liquid ejecting apparatus 100 according to a first embodiment. The liquid ejecting apparatus 100 is an ink jet printing apparatus that ejects ink, which is an example of a liquid, as droplets onto a medium 12. The medium 12 is typically print paper. The medium 12 is not limited to print paper and may also be a print target having any material such as a resin film or fabric cloth.

As illustrated in FIG. 1, a liquid container 14 storing the ink is attached to the liquid ejecting apparatus 100. Examples of the specific form of the liquid container 14 include a cartridge attachable to and detachable from the liquid ejecting apparatus 100, a bag-shaped ink pack formed of a flexible film, and an ink tank refillable with the ink. Any type of ink is stored in the liquid container 14.

The liquid ejecting apparatus 100 includes a controller 20, a transport mechanism 22, a moving mechanism 24, and a liquid ejecting head 26.

The controller 20 includes, for example, a processing circuit, such as a central processing unit (CPU) or a field-programmable gate array (FPGA), and a storage circuit, such as a semiconductor memory, to control the operation of each element of the liquid ejecting apparatus 100. Here, the controller 20 is an example of a "controller" to control driving of the liquid ejecting head 26.

The transport mechanism 22 transports the medium 12 in the Y2 direction under the control of the controller 20. The moving mechanism 24 moves the liquid ejecting head 26 back and forth in the λ1 direction and the λ2 direction under the control of the controller 20. In the example illustrated in FIG. 1, the moving mechanism 24 includes a substantially box-shaped transport body 242 called a carriage accommodating the liquid ejecting head 26 and a transport belt 244 to which the transport body 242 is fixed. The number of the liquid ejecting heads 26 mounted on the transport body 242 is not limited to one and may also be two or more. In addition to the liquid ejecting head 26, the above-described liquid container 14 may be mounted on the transport body 242.

The liquid ejecting head 26 ejects the ink supplied from the liquid container 14 in the Z2 direction toward the medium 12 from each of a plurality of nozzles under the control of the controller 20. This ejection is executed in parallel with the transport of the medium 12 by the transport mechanism 22 and the back-and-forth movement of the liquid ejecting head 26 by the moving mechanism 24, and thus an image is formed with the ink on a surface of the medium 12.

As described above, the liquid ejecting apparatus 100 includes the liquid ejecting head 26 and the controller 20 that is an example of a "controller" that controls an ink ejection operation of the liquid ejecting head 26.

1-2. Overall Configuration of Liquid Ejecting Head

Figure 2:
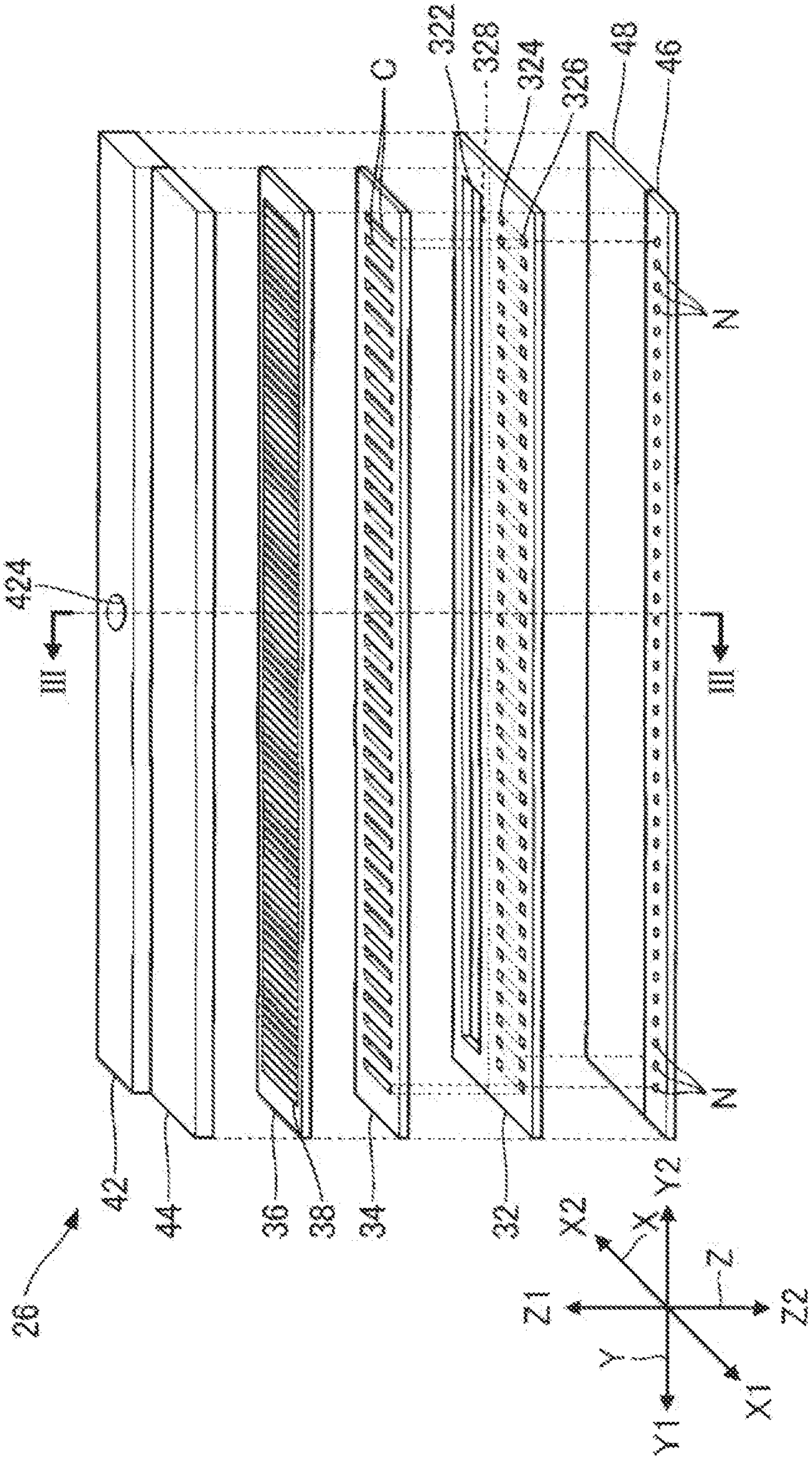
FIG. 2 is an exploded perspective view of a liquid ejecting head according to the first embodiment.
Figure 3:
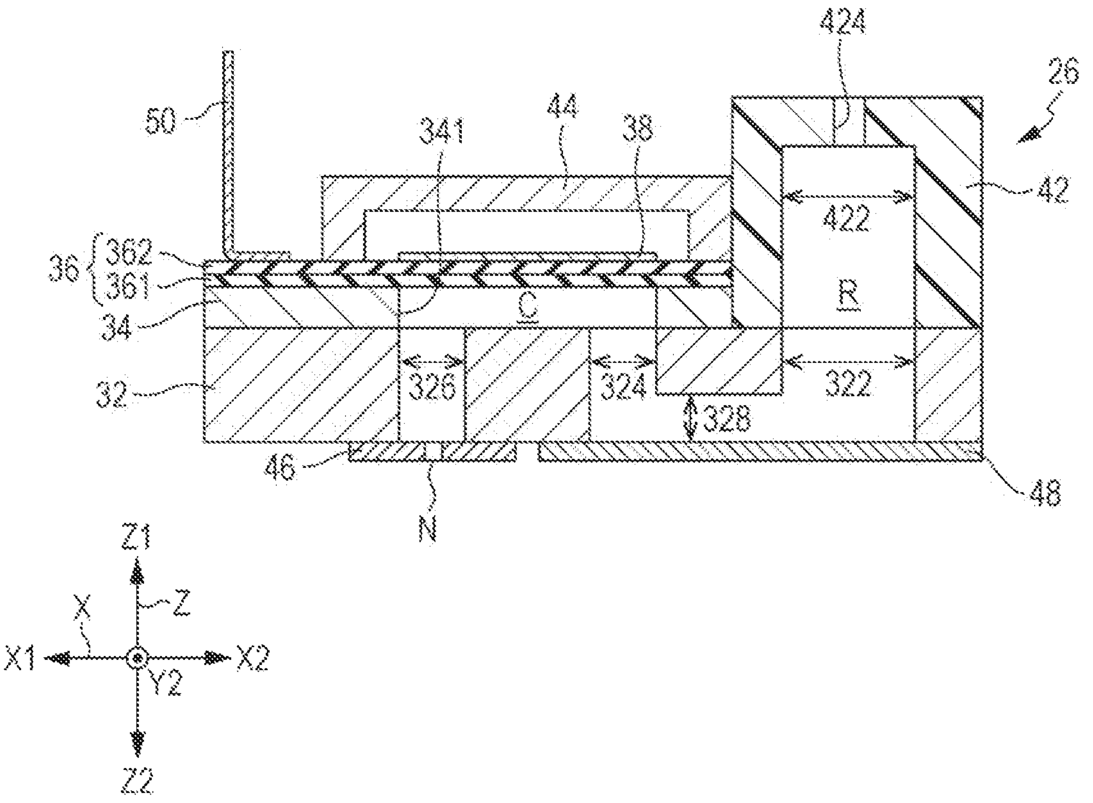
FIG. 3 is a cross-sectional view taken along a line III-III in FIG. 2.

FIG. 2 is an exploded perspective view of the liquid ejecting head 26 according to the first embodiment. FIG. 3 is a cross-sectional view taken along a line III-III in FIG. 2. As illustrated in FIGS. 2 and 3, the liquid ejecting head 26 includes a flow path substrate 32, a pressure chamber substrate 34, a diaphragm 36, a plurality of piezoelectric elements 38, a housing portion 42, a sealing body 44, a nozzle plate 46, a vibration absorber 48, and a wiring substrate 50.

Here, the pressure chamber substrate 34, the diaphragm 36, the piezoelectric elements 38, the housing portion 42, and the sealing body 44 are provided in an area located in the Z1 direction with respect to the flow path substrate 32. Conversely, the nozzle plate 46 and the vibration absorber 48 are provided in an area located in the Z2 direction with respect to the flow path substrate 32. The elements of the liquid ejecting head 26 are generally plate-like members elongated in the direction along the Y axis and are bonded to each other with for example an adhesive.

As illustrated in FIG. 2, the nozzle plate 46 is a plate-like member having a plurality of nozzles N arranged in the direction along the Y axis. Each of the nozzles N is a through-hole through which the ink passes. The nozzle plate 46 is manufactured by processing a silicon single-crystal substrate by a semiconductor manufacturing technique using a processing technique such as dry etching or wet etching. Other known methods and materials may be used as appropriate to manufacture the nozzle plate 46.

The flow path substrate 32 is a plate-like member to form an ink flow path. As illustrated in FIGS. 2 and 3, the flow path substrate 32 includes an opening 322, a plurality of supply flow paths 324, a plurality of communication flow paths 326, and a relay flow path 328. The opening 322 is an elongated through-hole extending in the direction along the Y axis in plan view in the direction along the Z axis so as to be continuous across the nozzles N. Each of the supply flow paths 324 and the communication flow paths 326 is a through-hole provided individually for each of the nozzles N. As illustrated in FIG. 3, the relay flow path 328 is provided on a surface of the flow path substrate 32 facing in the Z2 direction. The relay flow path 328 is a flow path provided across the supply flow paths 324 to form a communication between the opening 322 and the supply flow paths 324. Similarly to the above-described nozzle plate 46, the flow path substrate 32 is manufactured by processing a silicon single-crystal substrate by for example a semiconductor manufacturing technique. Other known methods and materials may be used as appropriate to manufacture the flow path substrate 32.

The pressure chamber substrate 34 is a plate-like member in which a plurality of pressure chambers C corresponding to the nozzles N is formed. The pressure chamber C is a space that is located between the flow path substrate 32 and the diaphragm 36 and that is referred to as a cavity to apply pressure to the ink filled in the pressure chamber C. The pressure chambers C are arranged in the direction along the Y axis. Each of the pressure chambers C is formed by holes 341 provided on both surfaces of the pressure chamber substrate 34 and has an elongated shape extending in the direction along the λ axis. That is, the pressure chamber C has an elongated shape along the λ axis when viewed in the direction along the Z axis that is the thickness direction of the diaphragm and the lateral direction of the pressure chamber C is the direction along the Y axis. An end of each of the pressure chamber C in the λ2 direction communicates with the corresponding supply flow path 324. An end of each of the pressure chambers C in the λ1 direction communicates with the corresponding communication flow path 326. Similarly to the above-described nozzle plate 46, the pressure chamber substrate 34 is manufactured by processing a silicon single-crystal substrate by for example a semiconductor manufacturing technique. Other known methods and materials may be used as appropriate to manufacture each of the pressure chamber substrates 34.

The diaphragm 36 is disposed on a surface of the pressure chamber substrate 34 facing in the Z1 direction. The diaphragm 36 is a plate-like member that is elastically deformable. In the example illustrated in FIG. 3, the diaphragm 36 includes a first layer 361 that is an elastic film and a second layer 362 that is an insulating film, and the first layer 361 and the second layer 362 are laminated in this order in the Z1 direction. The diaphragm 36 will be described below in detail in 1-3.

The piezoelectric elements 38 corresponding to the nozzles N or the pressure chambers C, which are different from each other, are disposed on a surface of the diaphragm 36 facing in the Z1 direction. Each of the piezoelectric elements 38 is a passive element that is deformed by a supplied drive signal and has an elongated shape extending in the direction along the λ axis. The piezoelectric elements 38 are arranged in the direction along the Y axis to correspond to the pressure chambers C. When the diaphragm 36 vibrates in conjunction with the deformation of the piezoelectric element 38, the pressure in the pressure chamber C fluctuates, which causes the ink to be ejected from the nozzle N. The piezoelectric element 38 will be described below in detail in 1-3.

The housing portion 42 is a case for storing the ink to be supplied to the pressure chambers C and is bonded to a surface of the flow path substrate 32 facing in the Z1 direction with an adhesive, or the like. The housing portion 42 is made of, for example, a resin material and is manufactured by injection molding. The housing portion 42 includes an accommodation portion 422 and an introduction port 424. The accommodation portion 422 is a recessed portion having an outer shape corresponding to the opening 322 of the flow path substrate 32. The introduction port 424 is a through-hole communicating with the accommodation portion 422. A space formed by the opening 322 and the accommodation portion 422 functions as a liquid storage chamber R that is a reservoir for storing the ink. The ink from the liquid container 14 is supplied to the liquid storage chamber R via the introduction port 424.

The vibration absorber 48 is an element that absorbs pressure fluctuations in the liquid storage chamber R. The vibration absorber 48 is, for example, a compliance substrate that is an elastically deformable and flexible sheet member. Here, the vibration absorber 48 is disposed on a surface of the flow path substrate 32 facing in the Z2 direction to close the opening 322, the relay flow path 328, and the supply flow paths 324 of the flow path substrate 32 and thus form a bottom surface of the liquid storage chamber R.

The sealing body 44 is a structure that protects the piezoelectric elements 38 and reinforces the mechanical strength of the pressure chamber substrate 34 and the diaphragm 36. The sealing body 44 is bonded to a surface of the diaphragm 36 with for example an adhesive. The sealing body 44 includes a recessed portion that accommodates the piezoelectric elements 38.

The wiring substrate 50 is bonded to a surface of the pressure chamber substrate 34 or the diaphragm 36 facing in the Z1 direction. The wiring substrate 50 is a mounting component on which a plurality of wires is formed to electrically couple the controller 20 and the liquid ejecting head 26. The wiring substrate 50 is a flexible wiring substrate such as flexible printed circuit (FPC) or flexible flat cable (FFC). A drive signal for driving the piezoelectric element 38 is supplied to the wiring substrate 50. The drive signal is supplied to each of the piezoelectric elements 38 via the wiring substrate 50.

1-3. Details of Diaphragm and Piezoelectric Element

Figure 4:
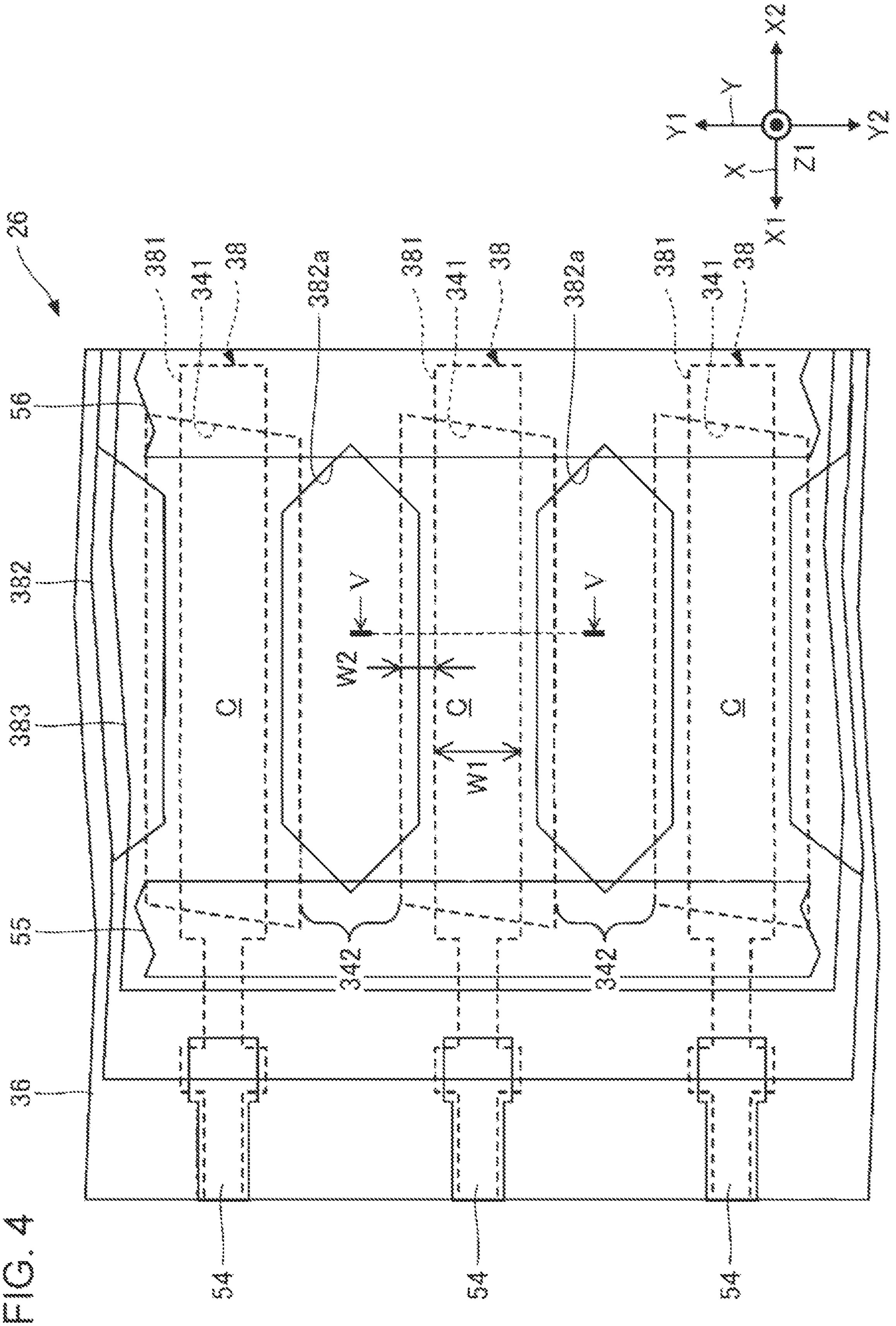
FIG. 4 is a plan view illustrating an example of the liquid ejecting head according to the first embodiment.
Figure 5:
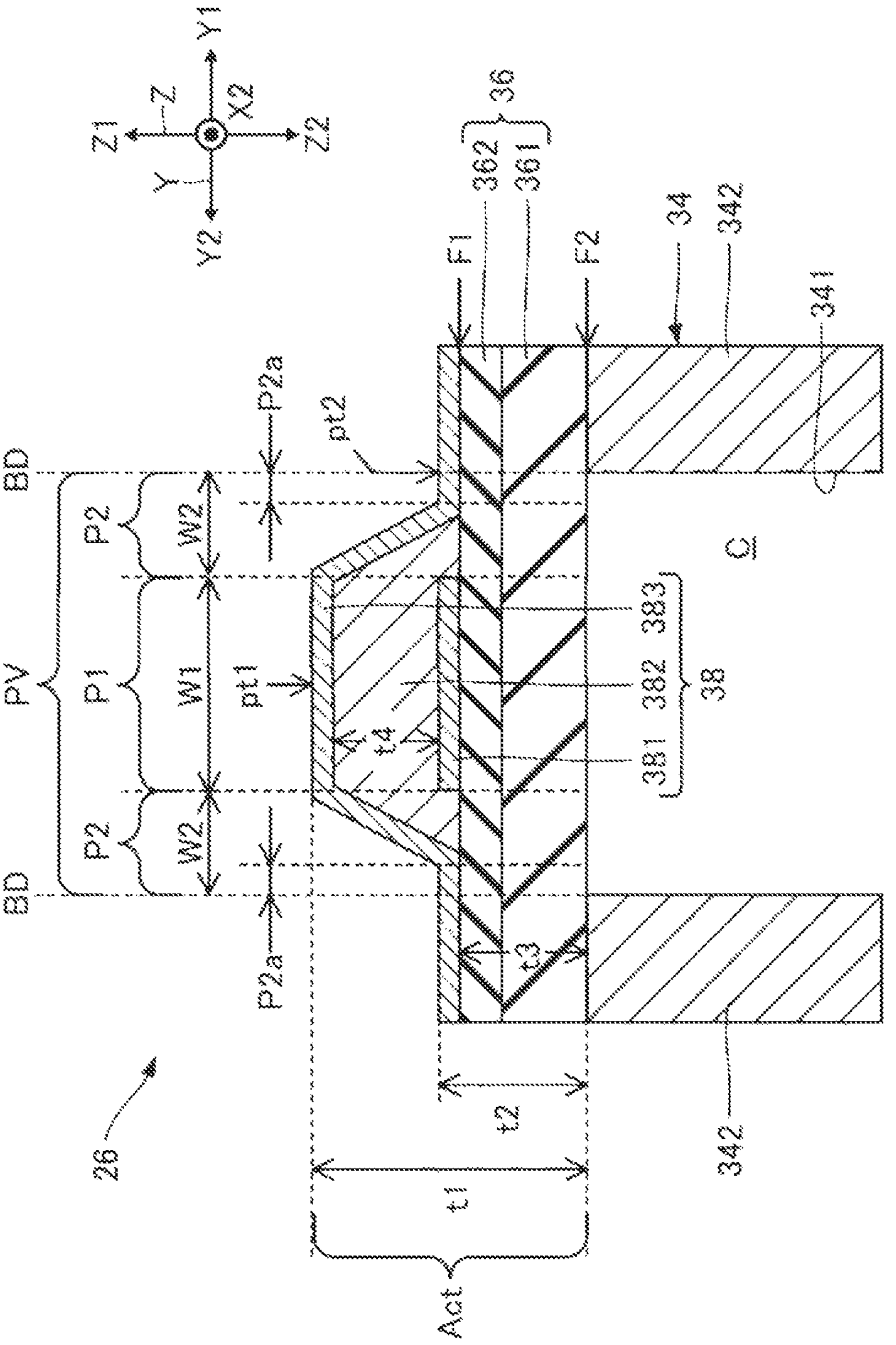
FIG. 5 is a cross-sectional view taken along a line V-V in FIG. 4.

FIG. 4 is a plan view illustrating an example of the liquid ejecting head 26 according to the first embodiment. FIG. 5 is a cross-sectional view taken along a line V-V in FIG. 4. FIGS. 4 and 5 illustrate the configuration of the liquid ejecting head 26 in more detailed manner than FIGS. 2 and 3 described above.

In the example illustrated in FIG. 4, the liquid ejecting head 26 includes a wiring layer 54, a weight layer 55, and a weight layer 56 in addition to the above-described components. Here, the wiring layer 54, the weight layer 55, and the weight layer 56 are provided on the piezoelectric element 38 and are positioned closest to the side in the Z1 direction among the components included inside the sealing body 44.

As illustrated in FIGS. 4 and 5, the pressure chamber substrate 34 includes a hole 341 forming the pressure chamber C. FIG. 4 illustrates the plan-view shape of the hole 341 by a broken line. A wall-shaped partition wall 342 extending along the λ direction is provided between the two adjacent pressure chambers C of the pressure chamber substrate 34. The partition wall 342 partitions the pressure chamber C. The pressure chamber substrate 34 is formed by, for example, anisotropically etching a silicon single-crystal substrate. As an etchant for the anisotropic etching, for example, a potassium hydroxide aqueous solution (KOH), or the like, is used. In the anisotropic etching, the first layer 361 of the diaphragm 36 is used as an etching stop layer.

In the example illustrated in FIG. 4, the hole 341 has the shape of a parallelogram in plan view. The hole 341 having such a shape in plan view is formed by, for example, anisotropically etching a silicon single-crystal substrate having a plane orientation (110). The shape of the hole 341 in plan view is not limited to the example illustrated in FIG. 4 and is optional.

The diaphragm 36 includes a first surface F1 and a second surface F2 opposite to the first surface F1. In the example illustrated in FIG. 5, the thickness direction of the diaphragm 36 is the direction along the Z axis. Therefore, the first surface F1 is a surface of the diaphragm 36 facing in the Z2 direction, and the second surface F2 is a surface of the diaphragm 36 facing in the Z1 direction. In the example illustrated in FIG. 5, a thickness t3 of the diaphragm 36 is constant, but the thickness t3 may also change in accordance with the position in the Y direction. The case in which the thickness t3 changes will be described in detail according to a second embodiment. The piezoelectric element 38 is disposed on the first surface F1. The pressure chamber substrate 34 is disposed on the second surface F2.

As illustrated in FIG. 5, the diaphragm 36 includes the first layer 361 and the second layer 362, which are laminated in this order in the Z1 direction. The first layer 361 is an elastic film made of, for example, silicon oxide ($SiO_2$). The elastic film is formed by, for example, thermally oxidizing one surface of a silicon single-crystal substrate. The second layer 362 is an insulating film made of, for example, zirconium oxide ($ZrO_2$). The insulating film is formed by, for example, forming a layer of zirconium by a sputtering method and thermally oxidizing the layer.

The first layer 361 may be made of, not only silicon oxide, but also another elastic material such as silicon alone. The constituent material of the second layer 362 is not limited to zirconium oxide and may also be, for example, another insulating material such as silicon nitride. Another layer such as metal oxide may be interposed between the first layer 361 and the second layer 362. In other words, the first layer 361 or the second layer 362 may be formed of a plurality of layers that are the same as or different from each other. Part or all of the diaphragm 36 may be integrally formed with the pressure chamber substrate 34 using the same material. Alternatively, the diaphragm 36 may be formed of a layer of a single material.

As illustrated in FIG. 4, the piezoelectric element 38 is overlapped with the pressure chamber C in plan view. As illustrated in FIG. 5, the piezoelectric element 38 includes a first electrode layer 381, a piezoelectric layer 382, and a second electrode layer 383, which are laminated in this order in the Z1 direction.

Another layer such as a layer for increasing adhesion may be interposed as appropriate between the layers of the piezoelectric element 38 or between the piezoelectric element 38 and the diaphragm 36. A seed layer may be provided between the first electrode layer 381 and the piezoelectric layer 382. The seed layer has a function to improve the orientation of the piezoelectric layer 382 when the piezoelectric layer 382 is formed. The seed layer is made of, for example, titanium (Ti) or complex oxide having a perovskite structure such as $Pb(Fe,Ti)O_3$. When the seed layer is made of titanium, island-shaped Ti serves as a crystal nucleus to improve the orientation of the piezoelectric layer 382 when the piezoelectric layer 382 is formed. In this case, the seed layer is formed to have a thickness of substantially 3 nm or more and 20 nm or less by, for example, a known film formation technique such as a sputtering method and a known processing technique using photolithography, etching, etc. In a case in which the seed layer is made of the complex oxide, the piezoelectric layer 382 is affected by a crystal structure of the seed layer when the piezoelectric layer 382 is formed, and thus the orientation of the piezoelectric layer 382 is improved. In this case, the seed layer is formed by, for example, forming a precursor layer of the composite oxide by a sol-gel method or a metal organic decomposition (MOD) method and firing and crystallizing the precursor layer.

The first electrode layers 381 are individual electrodes that are arranged apart from each other for the respective piezoelectric elements 38. Specifically, the first electrode layers 381 extending in the direction along the λ axis are arranged in the direction along the Y axis at an interval from each other. The drive signal for ejecting the ink from the nozzle N corresponding to the piezoelectric element 38 is applied to the first electrode layer 381 of each of the piezoelectric elements 38 via the wiring substrate 50.

The first electrode layer 381 includes, for example, a first layer made of titanium (Ti), a second layer made of platinum (Pt), and a third layer made of iridium (Ir), which are laminated in this order in the Z1 direction. The first electrode layer 381 is formed by, for example, a known film formation technique such as a sputtering method and a known processing technique using photolithography, etching, etc.

Here, the above-described first layer of the first electrode layer 381 functions as an adhesion layer that improves adhesion of the first electrode layer 381 to the diaphragm 36. The thickness of the first layer is not particularly limited and is, for example, substantially 3 nm or more and 50 nm or less. The constituent material of the first layer is not limited to titanium and, for example, chromium may be used instead of titanium.

The platinum forming the second layer described above and the iridium forming the third layer of the first electrode layer 381 are both electrode materials having desirable conductivity and having chemical properties similar to each other. This may result in the desirable characteristics of the first electrode layer 381 as an electrode. The thickness of the second layer is not particularly limited and is, for example, substantially 50 nm or more and 200 nm or less. The thickness of the third layer is not particularly limited and is, for example, substantially 4 nm or more and 20 nm or less.

The configuration of the first electrode layer 381 is not limited to the example described above. For example, either the second layer or the third layer described above may be omitted, or a layer made of iridium may be further provided between the first layer and the second layer described above. Instead of or in addition to the second layer and the third layer, a layer made of an electrode material other than iridium and platinum may be used. Examples of the electrode material include metal materials such as aluminum (Al), nickel (Ni), gold (Au), and copper (Cu), and one type thereof may be used alone, or two or more types thereof may be used in combination in the form of a laminate, an alloy, or the like.

The first electrode layer 381 described above is led out to a position in the λ1 direction with respect to the piezoelectric layer 382, and the wiring layer 54 is coupled to the first electrode layer 381. The wiring layer 54 is a conductive film that extends in the λ1 direction from the piezoelectric element 38 for each of the first electrode layers 381 and functions as wiring that couples the first electrode layer 381 and the wiring substrate 50. The wiring layer 54 includes, for example, a layer made of a nickel-chromium alloy and a layer made of gold, which are laminated in this order in the Z1 direction.

The piezoelectric layer 382 is disposed between the first electrode layer 381 and the second electrode layer 383. The piezoelectric layer 382 is shaped like a band extending in the direction along the Y axis to be continuous across the piezoelectric elements 38. In the example illustrated in FIG. 4, the piezoelectric layer 382 includes a through-hole **382*a* penetrating the piezoelectric layer 382 and extending in the direction along the λ axis in an area corresponding to the gap between the adjacent pressure chambers C in plan view. The piezoelectric layer 382 may be provided individually for the piezoelectric elements 38**.

The piezoelectric layer 382 is made of a piezoelectric material having a perovskite crystal structure represented by the general composition formula $ABO_3$. Examples of the piezoelectric material include lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead zirconate titanate niobate ($Pb(Zr,Ti,Nb)O_3$), and lead zirconium titanate magnesium niobate ($Pb(Zr,Ti)(Mg,Nb)O_3$). In particular, lead zirconate titanate is preferably used as the constituent material of the piezoelectric layer 382. The piezoelectric layer 382 may contain a small number of other elements such as impure substances. The piezoelectric material forming the piezoelectric layer 382 may also be a non-lead material such as barium titanate.

The piezoelectric layer 382 is formed by, for example, forming a precursor layer of a piezoelectric body by a liquid phase method such as a sol-gel method or a metal organic decomposition (MOD) method and firing and crystallizing the precursor layer. Here, the piezoelectric layer 382 may be formed of a single layer, but when the piezoelectric layer 382 is formed of a plurality of layers, it is advantageous in easily improving the characteristics of the piezoelectric layer 382 even though the piezoelectric layer 382 is thick.

The second electrode layer 383 is a band-shaped common electrode extending in the direction along the Y axis to be continuous across the piezoelectric elements 38. A predetermined reference voltage is applied to the second electrode layer 383.

The second electrode layer 383 includes, for example, a layer made of iridium (Ir) and a layer made of titanium (Ti), which are laminated in this order in the Z1 direction. The second electrode layer 383 is formed by, for example, a known film formation technique such as a sputtering method and a known processing technique using photolithography, etching, etc.

The constituent material of the second electrode layer 383 is not limited to iridium and titanium and may also be, for example, a metal material such as platinum (Pt), aluminum (Al), nickel (Ni), gold (Au), or copper (Cu). The second electrode layer 383 may be formed by using one type of these metal materials alone or may be formed by using two or more types thereof in combination in the form of a laminate, an alloy, or the like. The second electrode layer 383 may be formed of a single layer.

The weight layer 55 and the weight layer 56 illustrated in FIG. 4 are disposed on the second electrode layer 383 described above. The weight layer 55 and the weight layer 56 are weights for suppressing unnecessary vibrations of the diaphragm 36. Specifically, the weight layer 55 is a band-shaped conductive film extending along the Y axis along the edge of the second electrode layer 383 in the λ1 direction. The weight layer 56 is a band-shaped conductive film extending along the Y axis along the edge of the second electrode layer 383 in the λ2 direction. For example, similarly to the wiring layer 54 described above, each of the weight layer 55 and the weight layer 56 includes a layer formed of a nickel-chromium alloy and a layer formed of gold (Au), which are laminated in this order in the Z1 direction.

A structure Act including the diaphragm 36 and the piezoelectric element 38 described above includes a vibration portion PV that is a portion overlapped with the pressure chamber C in plan view. The vibration portion PV vibrates in the direction along the Z axis due to driving of the piezoelectric element 38.

The vibration portion PV includes an active portion P1 and a non-active portion P2. The active portion P1 is, in the structure Act, a portion where the pressure chamber C, the first electrode layer 381, the piezoelectric layer 382, and the second electrode layer 383 are all overlapped when viewed in the thickness direction of the diaphragm 36. Therefore, the active portion P1 is a laminated body including the diaphragm 36, the first electrode layer 381, the piezoelectric layer 382, and the second electrode layer 383. In the active portion P1, when the voltage is applied between the first electrode layer 381 and the second electrode layer 383, the piezoelectric layer 382 is deformed due to the inverse piezoelectric effect. This deforms the active portion P1.

In the example illustrated in FIG. 5, a thickness t1 of the active portion P1 is constant. The active portion P1 may include a plurality of portions having different thicknesses. Here, the thickness t1 may also be the thickness of the thinnest portion of the active portion P1 or the average thickness of the active portion P1.

A width W1 of the active portion P1 in the direction along the Y axis is constant over the entire area in the direction along the λ axis. The active portion P1 may also include a plurality of portions having different widths. In this case, the width W1 is, for example, the average width of the active portion P1.

The non-active portion P2 is, in the structure Act, a portion that is overlapped with the pressure chamber C at a position different from the active portion P1 and is adjacent to the active portion P1 in the lateral direction of the pressure chamber C when viewed in the thickness direction of the diaphragm 36. Here, the non-active portion P2 is, in the structure Act, a portion overlapped with the pressure chamber C other than the active portion P1 when viewed in the thickness direction of the diaphragm 36 and is located between the active portion P1 and the partition wall 342 when viewed in the thickness direction of the diaphragm 36. According to the present embodiment, the non-active portion P2 is a laminated body excluding the first electrode layer 381 and including the diaphragm 36, the piezoelectric layer 382, and the second electrode layer 383. The non-active portion P2 is deformed in accordance with the deformation of the active portion P1. Accordingly, the entire vibration portion PV is deformed in the thickness direction of the diaphragm 36. According to the present embodiment, part of the piezoelectric layer 382 is present in the non-active portion P2, but the part is not interposed between the first electrode layer 381 and the second electrode layer 383. Therefore, even when the voltage is applied between the first electrode layer 381 and the second electrode layer 383, the inverse piezoelectric effect does not occur in the non-active portion P2. That is, the non-active portion P2 may be defined as a portion excluding at least one of the first electrode layer 381, the second electrode layer 383, and the piezoelectric layer 382 in the structure Act overlapped with the pressure chamber C when viewed in the thickness direction of the diaphragm 36.

According to the present embodiment, a thickness t2 of the non-active portion P2 is smaller than the thickness t1 of the active portion P1. Therefore, the bending rigidity of the non-active portion P2 is lower than the bending rigidity of the active portion P1. Here, the non-active portion P2 may include a plurality of portions having different thicknesses and, in this case, the thickness t2 is the thickness of the thinnest portion of the non-active portion P2. The thickness t2 may be the average thickness of the non-active portion P2.

In the example illustrated in FIG. 5, the piezoelectric layer 382 in the non-active portion P2 has a shape that becomes thinner from the active portion P1 toward the partition wall 342. Here, a thickness t4 of the piezoelectric layer 382 is constant over the entire area of the active portion P1. The piezoelectric layer 382 is partially provided in part of the non-active portion P2 in the direction along the λ axis, and the non-active portion P2 includes a portion P2*a* that does not include the piezoelectric layer 382. The portion P2*a* is also referred to as an "arm portion" and is a most easily deformed portion of the vibration portion PV. The portion P2*a* according to the present embodiment is the thinnest portion of the non-active portion P2. The entire area of the non-active portion P2 may exclude the piezoelectric layer 382. In this case, the entire area of the non-active portion P2 forms the "arm portion".

A width W2 of the non-active portion P2 in the direction along the Y axis is constant over the entire area in the direction along the λ axis. Here, from the viewpoint of efficiently deforming the vibration portion PV, it is preferable that the width W2 is equal to or more than the width W1, i.e., $1 \leq W1/W2$. Furthermore, from the viewpoint of reducing damages such as cracks of the diaphragm 36, it is preferable that the width W2 is one-fifth or more of the width W1, i.e., $W1/W2 \leq 5$. The non-active portion P2 may also include a plurality of portions having different widths. In this case, the width W2 is, for example, the average width of the non-active portion P2.

In the vibration portion PV described above, the relation between the bending rigidities of the active portion P1 and the non-active portion P2 is defined from the viewpoint of reducing damages such as cracks of the diaphragm 36. Specifically, $EI1/EI2 \leq 40$, wherein a first position pt1 is a position on an inner side of the active portion P1 when viewed in the thickness direction of the diaphragm 36, a second position pt2 is a position on an inner side of the non-active portion P2 and closest to a boundary BD between the pressure chamber C and the partition wall 342 when viewed in the thickness direction of the diaphragm 36, EI1 is the bending rigidity of the active portion P1 at the first position pt1, and EI2 is the bending rigidity of the non-active portion P2 of the structure Act at the second position pt2.

Figure 6:
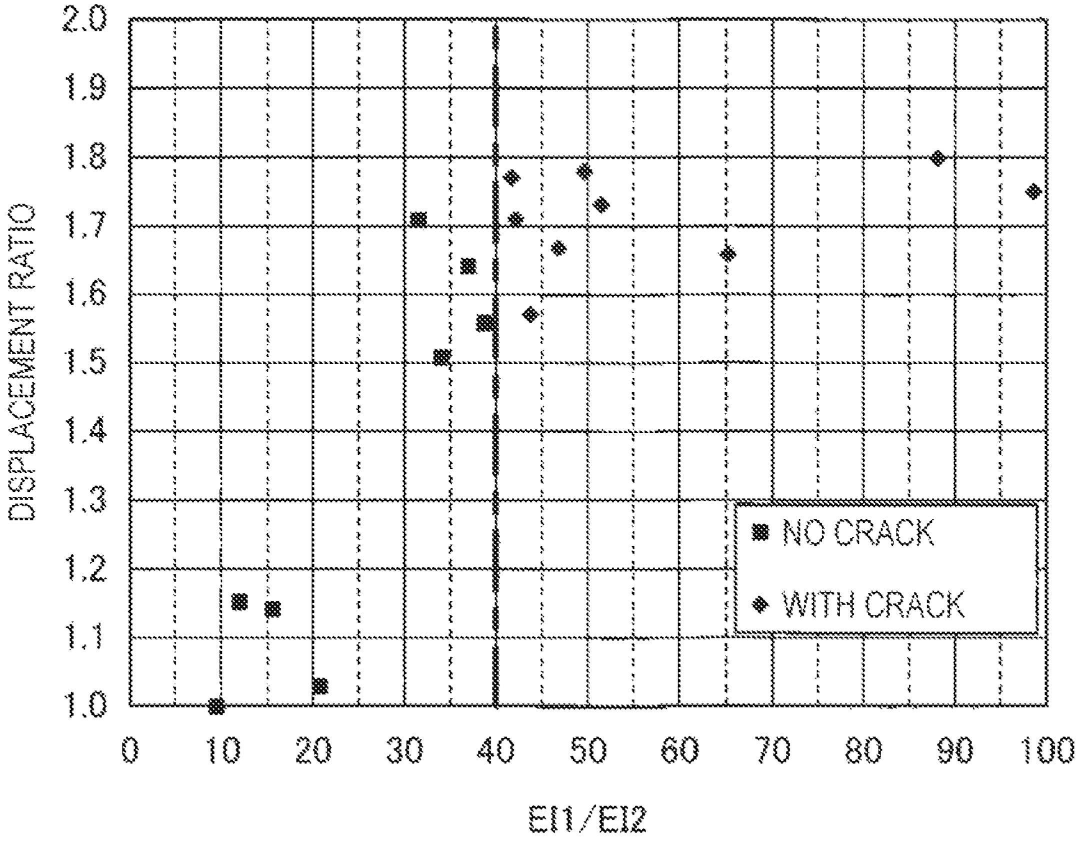
FIG. 6 is a graph illustrating the relation between a bending rigidity ratio (EI1/EI2) and a displacement ratio.

FIG. 6 is a graph illustrating the relation between a bending rigidity ratio (EI1/EI2) and a displacement ratio.

FIG. 6 illustrates the results obtained when the displacement amount of the diaphragm 36 is measured when a predetermined voltage is applied to the piezoelectric element 38 for each of a plurality of samples having different EI1/EI2 and the measured value of the sample having the smallest displacement amount of the diaphragm 36 is normalized as 1 to obtain the value as a displacement ratio. For each sample, the bending rigidity ratio (EI1/EI2) is changed by appropriately adjusting the ratio of the thickness t1 of the active portion P1 to the thickness t2 of the non-active portion P2 and the thickness of each layer.

In FIG. 6, the shape of a marker in a case in which EI1/EI2≤40 is different from that of a marker when it is not the case. In a case in which EI1/EI2≤40, damages such as cracks of the diaphragm 36 do not occur even when a predetermined voltage is applied to the piezoelectric element 38 more than a predetermined number of times. On the other hand, in a case in which EI1/EI2≤40, damages such as cracks occur in the diaphragm 36 when a predetermined voltage is applied to the piezoelectric element 38 more than a predetermined number of times.

The bending rigidity ratio (EI1/EI2) may be EI1/EI2≤40, but as understood from FIG. 6, it is preferable that 1≤EI1/EI2≤40 from the viewpoint of improving the displacement amount of the diaphragm 36, and it is more preferable that 30<EI1/EI2≤40 from the viewpoint of achieving both improvement of the displacement amount of the diaphragm 36 and reduction of damages such as cracks.

Here, the bending rigidity is represented by a product (EI) of a second moment of area I, which is determined by the cross-sectional shape and size of a member, and a Young's modulus E of the material forming the member, and indicates the difficulty of bending deformation of the member. Here, the second moment of area is referred to as a moment of inertia of area. In a structure having a laminated structure such as the active portion P1 and the non-active portion P2 described above, the bending rigidity EI is generally expressed by the following equation (1).

$$EI = \sum_{i=1}^{n} E_i I_i = \frac{b}{3}\sum_{i=1}^{n} E_i\{(h_i - \lambda)^3 - (h_{i-1} - \lambda)^3\} \quad (1)$$

In the equation (1), n is the number of laminated layers of the structure. $E_i$ is the Young's modulus of the material forming each layer of the structure. $I_i$ is the second moment of area of each layer of the structure. $E_iI_i$ is the bending rigidity of each layer of the structure. b is the width of the structure. $h_i$ is a distance to each layer when the lowermost layer of the structure is used as a reference. λ is a neutral axis position of the structure and is represented by the following equation (2).

$$\lambda = \frac{\sum_{i=1}^{n} E_i(h_i^2 - h_{i-1}^2)}{2\sum_{i=1}^{n} E_i t_i} \quad (2)$$

In the equation (2), $t_i$ is the thickness of each layer of the structure.

Here, when it is assumed that an end of the structure Act in the λ axis is fixed by the partition wall 342 and the bending rigidity of the structure Act is obtained in the case of bending with the span length in the X axis direction, b is the width in the Y axis direction. To obtain the bending rigidity at the first position pt1, the value of the width W1 of the active portion P1 along the Y axis is substituted as b. On the other hand, to obtain the bending rigidity at the second position pt2, the value of the width of the portion P2*a* along the Y axis is substituted as b. That is, to obtain the bending rigidity at the second position pt2, the value of the width in the range of the non-active portion P2 and in the range with the thickness equal to that at the second position pt2 in the Z axis direction is substituted as b. When the thickness in the Z axis direction is equal in the active portion P1 and the non-active portion P2 as in a fifth embodiment described below, the width W2 of the non-active portion may be substituted as b to obtain the bending rigidity at the second position pt2.

As understood from the equation (1), the bending rigidity EI of the structure varies depending on the neutral axis position X. Therefore, it is preferable that the relation between the neutral axis positions λ of the active portion P1 and the non-active portion P2 is defined such that the bending rigidity ratio EI1/EI2 described above is satisfied. Specifically, it is preferable that λ1/λ2≤1.8, wherein λ1 is the neutral axis position λ of the active portion P1 and λ2 is the neutral axis position λ of the non-active portion P2.

Here, the neutral axis position λ1 is the distance between the second surface F2 and the neutral axis of the active portion P1 along the thickness direction of the diaphragm 36. The neutral axis position λ2 is the distance between the second surface F2 and the neutral axis of the non-active portion P2 along the thickness direction of the diaphragm 36.

Figure 7:
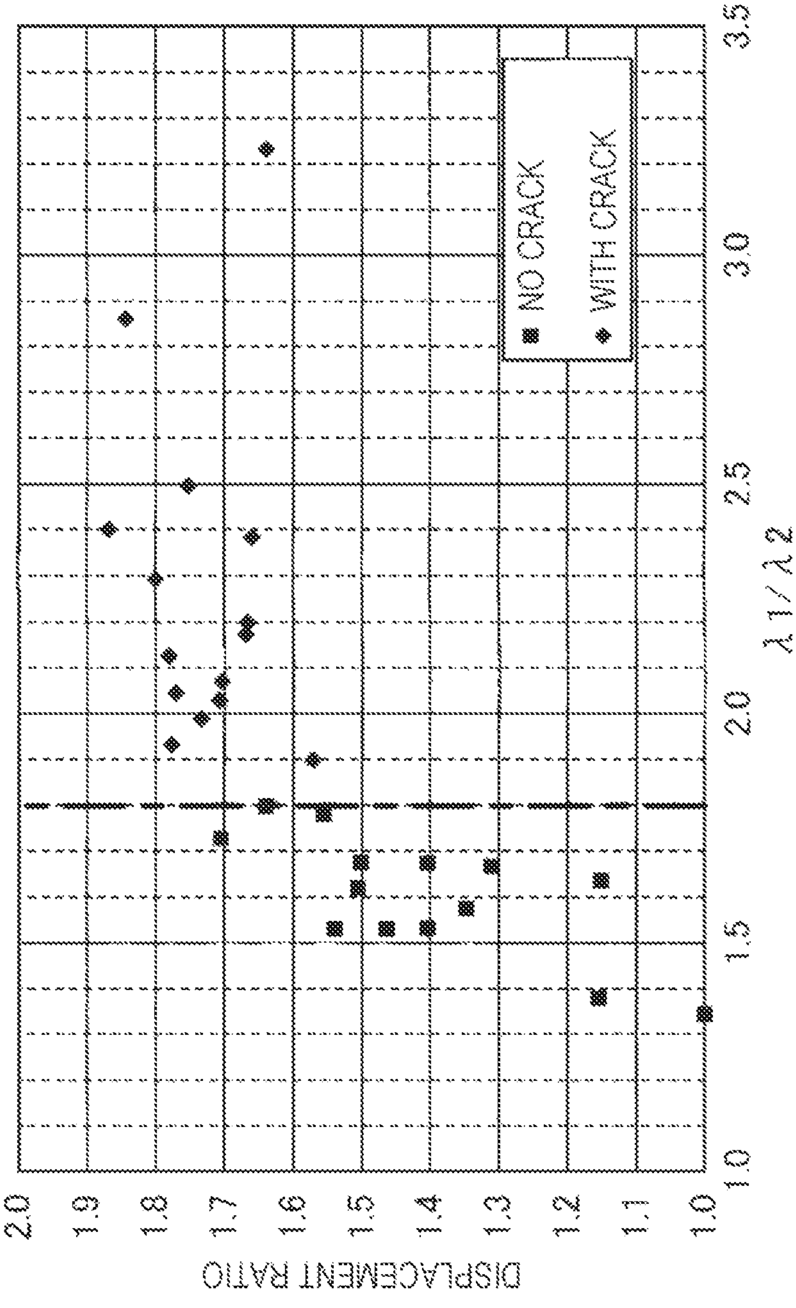
FIG. 7 is a graph illustrating the relation between a neutral axis position ratio (λ1/λ2) and a displacement ratio.

FIG. 7 is a graph illustrating the relation between a neutral axis position ratio (λ1/λ2) and a displacement ratio. FIG. 7 illustrates the results obtained when the displacement amount of the diaphragm 36 is measured when a predetermined voltage is applied to the piezoelectric element 38 for each of a plurality of samples having different λ1/λ2 and the measured value of the sample having the smallest displacement amount of the diaphragm 36 is normalized as 1 to obtain the value as a displacement ratio. For each sample, the neutral axis position ratio (λ1/λ2) is changed by appropriately adjusting the ratio of the thickness t1 of the active portion P1 to the thickness t2 of the non-active portion P2 and the thickness of each layer.

In FIG. 7, the shape of a marker in a case in which λ1/λ2≤1.8 is different from that of a marker when it is not the case. In a case in which λ1/λ2≤1.8, damages such as cracks of the diaphragm 36 do not occur even when a predetermined voltage is applied to the piezoelectric element 38 more than a predetermined number of times. On the other hand, in a case in which λ1/λ2>1.8, a damage such as crack occurs in the diaphragm 36 when a predetermined voltage is applied to the piezoelectric element 38 more than a predetermined number of times.

As understood from FIG. 7, for the neutral axis position ratio (λ1/λ2), it is preferable that 1<λ1/λ2≤1.8 from the viewpoint of improving the displacement amount of the diaphragm 36, and it is more preferable that 1.5<λ1/λ2 1.8 from the viewpoint of achieving both improvement of the displacement amount of the diaphragm 36 and reduction of damages such as cracks.

As described above, the above liquid ejecting head 26 includes the diaphragm 36, the piezoelectric element 38, and the partition wall 342. The diaphragm 36 includes the first surface F1 and the second surface F2 opposite to the first surface F1. The piezoelectric element 38 is disposed on the first surface F1 and includes the first electrode layer 381, the piezoelectric layer 382, and the second electrode layer 383. The first electrode layer 381, the piezoelectric layer 382, and the second electrode layer 383 are laminated in this order on the first surface F1. The partition wall 342 is disposed on the second surface F2 to partition the pressure chamber C communicating with the nozzle N. The pressure chamber C has an elongated shape when viewed in the thickness direction of the diaphragm 36. The idea that "one of two objects is disposed on the other object" includes not only the case in which the two objects are in contact with each other but also the case in which another object is interposed between the two objects.

In addition, EI1/EI2≤40, wherein EI1 is the bending rigidity EI of the active portion P1 of the structure Act, which includes the diaphragm 36 and the piezoelectric element 38, at the first position pt1 and EI2 is the bending rigidity EI of the non-active portion P2 of the structure Act at the second position pt2. As described above, the active portion P1 is, in the structure Act, a portion where the pressure chamber C, the first electrode layer 381, the piezoelectric layer 382, and the second electrode layer 383 are all overlapped when viewed in the thickness direction of the diaphragm 36. The non-active portion P2 is, in the structure Act, a portion that is overlapped with the pressure chamber C at a position different from the active portion P1 and is adjacent to the active portion P1 in the lateral direction of the pressure chamber C when viewed in the thickness direction of the diaphragm 36 and is located between the active portion P1 and the partition wall 342 when viewed in the thickness direction of the diaphragm 36. The first position pt1 is a position on an inner side of the active portion P1 when viewed in the thickness direction of the diaphragm 36. The second position pt2 is a position on an inner side of the non-active portion P2 and closest to the boundary BD between the pressure chamber C and the partition wall 342 when viewed in the thickness direction of the diaphragm 36.

In the liquid ejecting head 26 described above, as EI1/EI2≤40, it is possible to reduce damages such as cracks of the diaphragm 36. As a result, the reliability of the liquid ejecting head 26 may be improved as compared to the related art.

When 1<EI1/EI2, the displacement amount of the diaphragm 36 may be increased as compared to a configuration in which 1≥EI1/EI2.

When 30≤EI1/EI2, the displacement amount of the diaphragm 36 may be increased, damages such as cracks of the diaphragm 36 may be reduced, and the desirable balance between them may be obtained.

According to the present embodiment, as described above, the thickness t1 of the active portion P1 is larger than the thickness t2 of the non-active portion P2. Therefore, even when the Young's modulus of the material forming the vibration portion PV in the structure Act is constant in the lateral direction of the pressure chamber C, the bending rigidity EI1 of the active portion P1 may be higher than the bending rigidity EI2 of the non-active portion P2. Also, the relation of the neutral axis position ratio described above may be satisfied.

As described above, W1/W2≤5, wherein W1 is the width of the active portion P1 along the lateral direction of the pressure chamber C and W2 is the width of the non-active portion P2 along the lateral direction of the pressure chamber C, and therefore damages such as cracks of the diaphragm 36 may be reduced as compared to a configuration in which W1/W2>5.

As described above, when 1≤W1/W2, the displacement amount of the diaphragm 36 may be increased as compared to a configuration in which 1>W1/W2.

2. Second Embodiment

The second embodiment of the present disclosure will be described below. In the embodiment described below, the element having the same operation and function as that in the first embodiment is denoted by the same reference numeral as that used in the description of the first embodiment, and detailed description thereof is omitted as appropriate.

Figure 8:
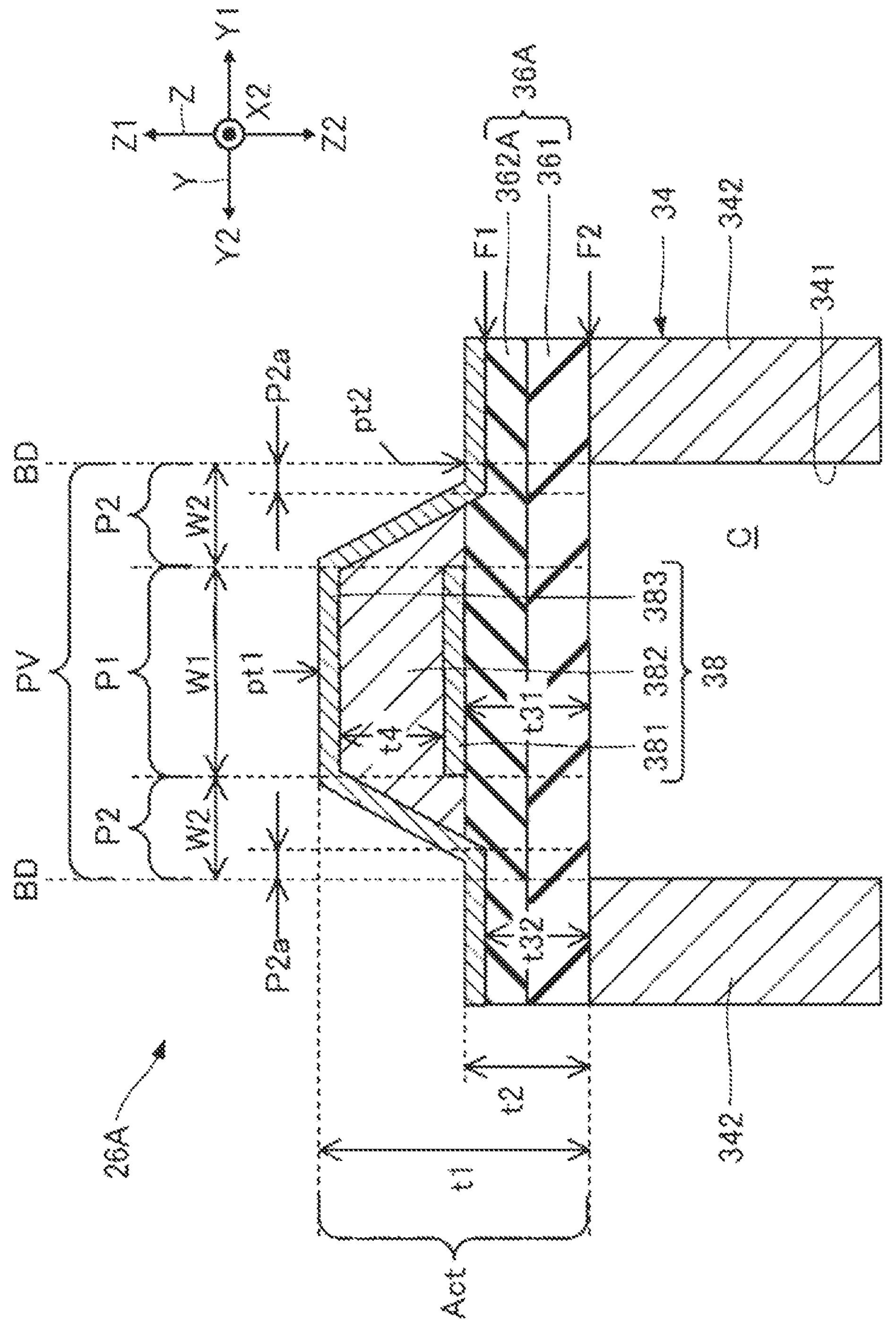
FIG. 8 is a cross-sectional view of a liquid ejecting head according to a second embodiment.

FIG. 8 is a cross-sectional view of a liquid ejecting head 26A according to the second embodiment. The liquid ejecting head 26A is configured in the same manner as the liquid ejecting head 26 according to the first embodiment described above except that the liquid ejecting head 26A includes a diaphragm 36A instead of the diaphragm 36. The diaphragm 36A is configured in the same manner as the diaphragm 36 except that the diaphragm 36A includes a second layer 362A instead of the second layer 362. The second layer 362A is configured in the same manner as the second layer 362 except that the second layer 362A has a different thickness distribution.

In the second layer 362A, the thickness of the non-active portion P2 is smaller than the thickness of the active portion P1. Therefore, in the diaphragm 36A, a thickness t32 of the non-active portion P2 is smaller than a thickness t31 of the active portion P1. The second layer 362A is obtained due to, for example, overetching when the piezoelectric layer 382 is patterned. The thickness t31 and the thickness t32 are determined as appropriate to satisfy EI1/EI2 described above.

According to the second embodiment described above, too, the reliability of the liquid ejecting head 26A may be improved as in the first embodiment described above. According to the present embodiment, as described above, the thickness t32 of the thinnest portion of the diaphragm 36A in the non-active portion P2 is smaller than the thickness t31 of the thinnest portion of the diaphragm 36A in the active portion P1. Therefore, even when the Young's modulus of the material forming the diaphragm 36A is constant in the lateral direction of the pressure chamber C, the bending rigidity of the diaphragm 36A in the active portion P1 may be higher than the bending rigidity of the diaphragm 36A in the non-active portion P2. As a result, the bending rigidity of the active portion P1 may be higher than the bending rigidity of the non-active portion P2. Also, the relation of the neutral axis position ratio described above may be satisfied.

3. Third Embodiment

A third embodiment of the present disclosure will be described below. In the embodiment described below, the element having the same operation and function as that in the first embodiment is denoted by the same reference numeral as that used in the description of the first embodiment, and detailed description thereof is omitted as appropriate.

Figure 9:
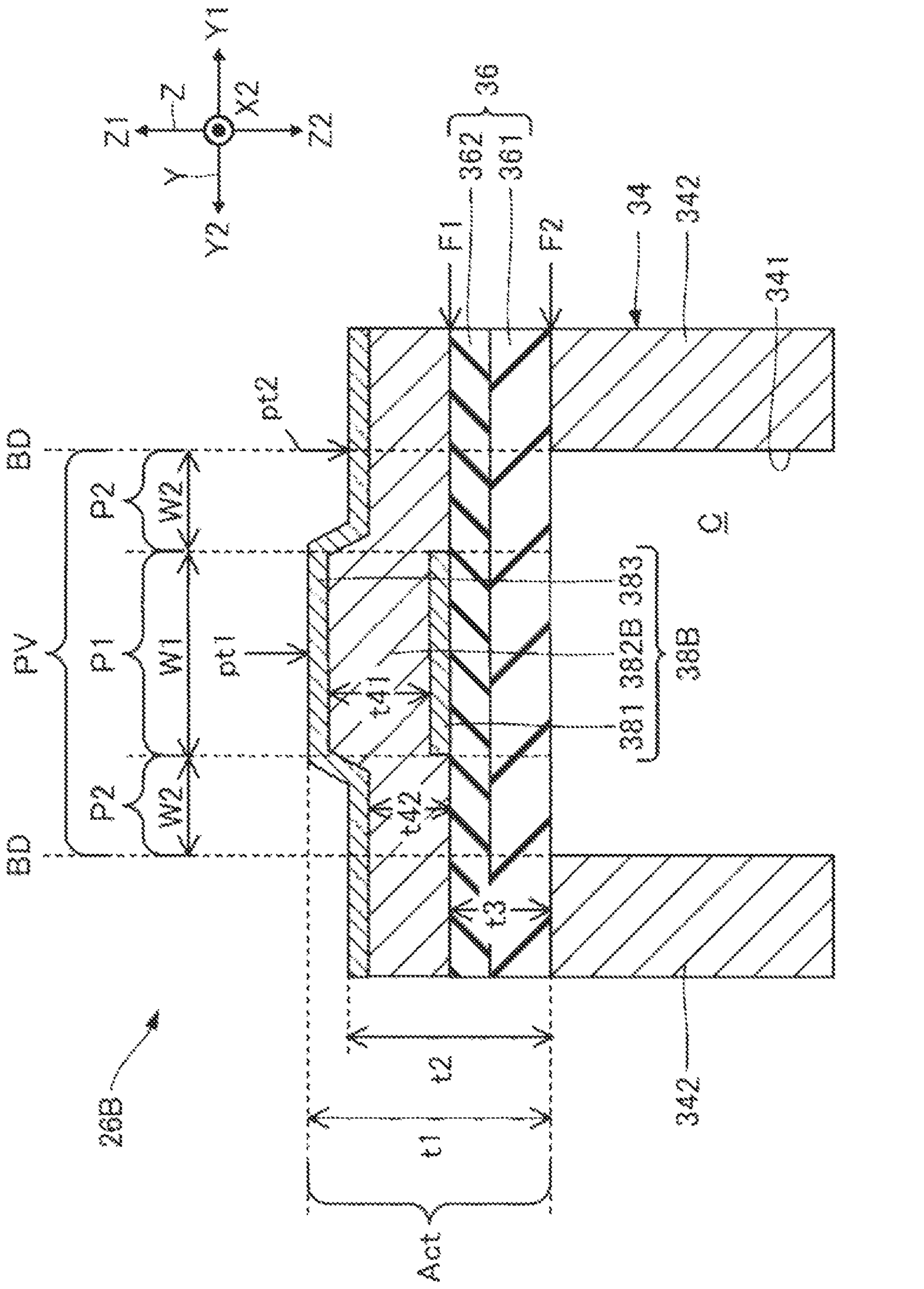
FIG. 9 is a cross-sectional view of a liquid ejecting head according to a third embodiment.

FIG. 9 is a cross-sectional view of a liquid ejecting head 26B according to the third embodiment. The liquid ejecting head 26B is configured in the same manner as the liquid ejecting head 26 according to the first embodiment described above except that the liquid ejecting head 26B includes a piezoelectric element 38B instead of the piezoelectric element 38. The piezoelectric element 38B is configured in the same manner as the piezoelectric element 38 except that the piezoelectric element 38B includes a piezoelectric layer 382B instead of the piezoelectric layer 382. The piezoelectric layer 382B is configured in the same manner as the piezoelectric layer 382 except that the piezoelectric layer 382B has a different thickness distribution.

The piezoelectric layer 382B is disposed over both the active portion P1 and the non-active portion P2. In the piezoelectric layer 382B, a thickness t42 of the non-active portion P2 is smaller than a thickness t41 of the active portion P1. The piezoelectric layer 382B is obtained by, for example, omitting the formation of the through-hole 382*a* described above. The thickness t41 and the thickness t42 are determined as appropriate to satisfy EI1/EI2 described above.

According to the third embodiment described above, too, the reliability of the liquid ejecting head 26B may be improved as in the first embodiment described above. According to the present embodiment, as described above, the piezoelectric layer 382B is disposed over both the active portion P1 and the non-active portion P2. The thickness t42 of the thinnest portion of the piezoelectric layer 382B in the non-active portion P2 is smaller than the thickness t41 of the thinnest portion of the piezoelectric layer 382B in the active portion P1. Therefore, even when the Young's modulus of the material forming the piezoelectric layer 382B is constant in the lateral direction of the pressure chamber C, the bending rigidity of the piezoelectric layer 382B in the active portion P1 may be higher than the bending rigidity of the piezoelectric layer 382B in the non-active portion P2. As a result, the bending rigidity of the active portion P1 may be higher than the bending rigidity of the non-active portion P2. Also, the relation of the neutral axis position ratio described above may be satisfied. Even when the thickness t41 and the thickness t42 are identical, the thickness of the first electrode layer 381 disposed in the active portion P1 is adjusted as appropriate to satisfy the above-described EI1/EI2, and thus the bending rigidity of the active portion P1 may be higher than the bending rigidity of the non-active portion P2.

4. Fourth Embodiment

A fourth embodiment of the present disclosure will be described below. In the embodiment described below, the element having the same operation and function as that in the first embodiment is denoted by the same reference numeral as that used in the description of the first embodiment, and detailed description thereof is omitted as appropriate.

Figure 10:
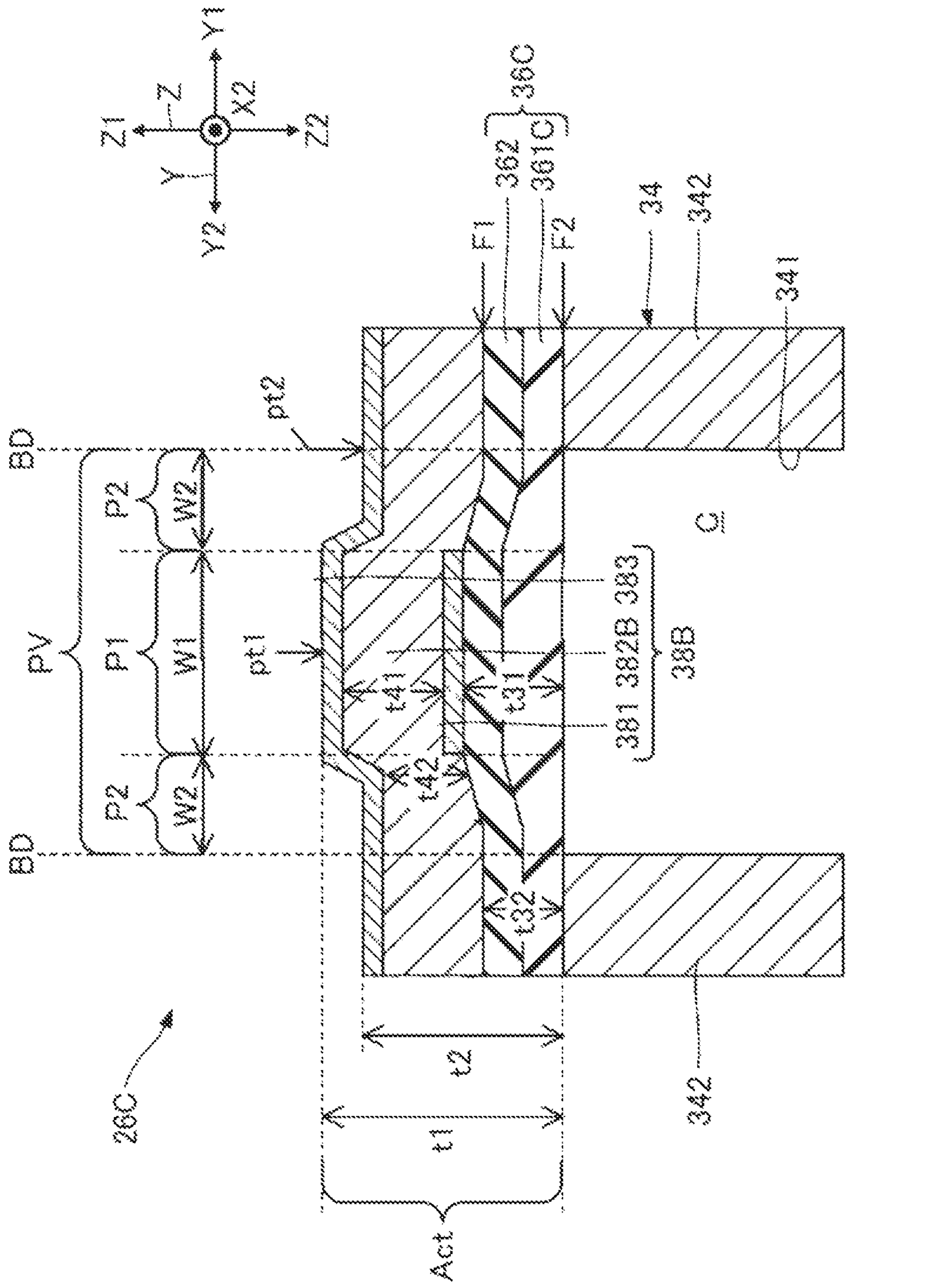
FIG. 10 is a cross-sectional view of a liquid ejecting head according to a fourth embodiment.

FIG. 10 is a cross-sectional view of a liquid ejecting head 26C according to the fourth embodiment. The liquid ejecting head 26C is configured in the same manner as the liquid ejecting head 26 according to the first embodiment described above except that the liquid ejecting head 26C includes a diaphragm 36C and the piezoelectric element 38B instead of the diaphragm 36 and the piezoelectric element 38. The diaphragm 36C is configured in the same manner as the diaphragm 36 except that the diaphragm 36C includes a first layer 361C instead of the first layer 361. The first layer 361C is configured in the same manner as the first layer 361 except that the first layer 361C has a different thickness distribution. The piezoelectric element 38B according to the present embodiment is configured in the same manner as the piezoelectric element 38B according to the third embodiment described above.

In the first layer 361C, the thickness of the non-active portion P2 is smaller than the thickness of the active portion P1. Therefore, in the diaphragm 36C, the thickness t32 of the non-active portion P2 is smaller than the thickness t31 of the active portion P1. The first layer 361C is obtained by, for example, removing part of one surface of an elastic film, which is formed by thermal oxidation as described above, by etching using hydrofluoric acid, ion milling, etc. The thickness t31 and the thickness t32 are determined as appropriate to satisfy EI1/EI2 described above. According to the present embodiment, the thickness t41 and the thickness t42 may be identical to each other.

According to the fourth embodiment described above, too, the reliability of the liquid ejecting head 26C may be improved as in the first embodiment described above. According to the present embodiment, the same advantageous effects as those of the second embodiment and the third embodiment described above may also be obtained.

5. Fifth Embodiment

The fifth embodiment of the present disclosure will be described below. In the embodiment described below, the element having the same operation and function as that in the first embodiment is denoted by the same reference numeral as that used in the description of the first embodiment, and detailed description thereof is omitted as appropriate.

Figure 11:
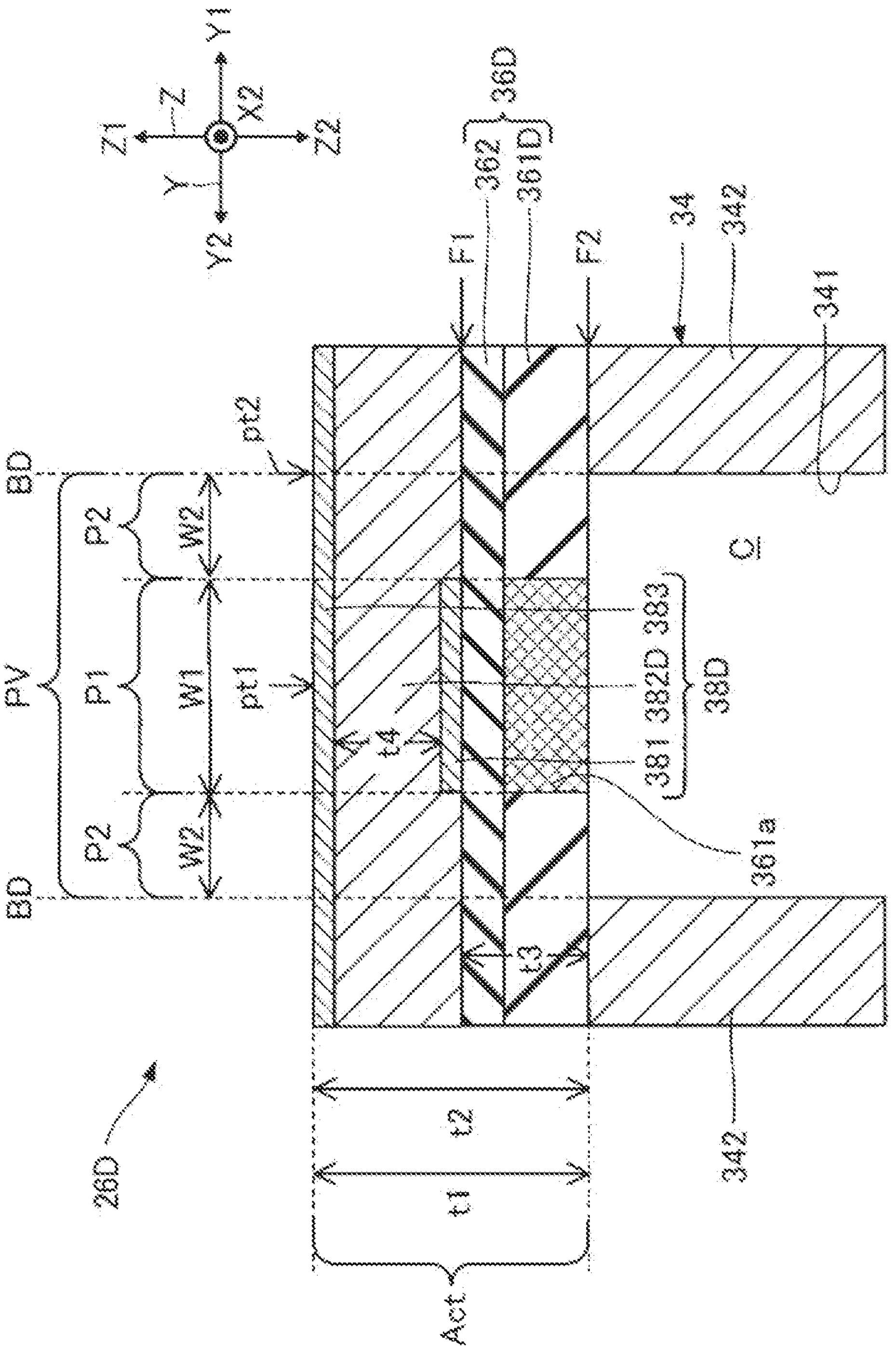
FIG. 11 is a cross-sectional view of a liquid ejecting head according to a fifth embodiment.

FIG. 11 is a cross-sectional view of a liquid ejecting head 26D according to the fifth embodiment. The liquid ejecting head 26D is configured in the same manner as the liquid ejecting head 26 according to the first embodiment described above except that the liquid ejecting head 26D includes a diaphragm 36D and a piezoelectric element 38D instead of the diaphragm 36 and the piezoelectric element 38. The diaphragm 36D is configured in the same manner as the diaphragm 36 except that the diaphragm 36D includes a first layer 361D instead of the first layer 361. The first layer 361D is configured in the same manner as the first layer 361 except that the first layer 361D includes a portion 361*a*. The piezoelectric element 38D is configured in the same manner as the piezoelectric element 38 except that the piezoelectric element 38D includes a piezoelectric layer 382D instead of the piezoelectric layer 382. The piezoelectric layer 382D is configured in the same manner as the piezoelectric layer 382 except that the piezoelectric layer 382D has a different thickness distribution.

The portion 361*a* does not belong to the non-active portion P2 but belongs to the active portion P1 and is made of a material having a composition different from those of the other portions of the first layer 361D. The Young's modulus of the material forming the portion 361*a* is higher than the Young's modulus of the materials forming the other portions of the first layer 361D. The portion 361*a* is obtained by, for example, making the degree of oxidization of a silicon oxide film forming the first layer 361D different from those of the other portions or by doping an impurity element by ion implantation. The thickness t3 of the diaphragm 36D is constant in the example illustrated in FIG. 11, but not limited thereto. For example, the thickness t3 of the diaphragm 36D may be different in the non-active portion P2 and the active portion P1 as in the diaphragm 36A according to the second embodiment or the diaphragm 36C according to the fourth embodiment described above.

The piezoelectric layer 382D is disposed over both the active portion P1 and the non-active portion P2. The thickness t4 of the piezoelectric layer 382D is constant. The thickness t4 of the piezoelectric layer 382D may be different in the non-active portion P2 and the active portion P1 as in the piezoelectric layer 382B according to the third embodiment described above.

According to the fifth embodiment, too, the reliability of the liquid ejecting head 26D may be improved as in the first embodiment described above. According to the present embodiment, as described above, the Young's modulus of the material forming the diaphragm 36D in the active portion P1 is higher than the Young's modulus of the material forming the diaphragm 36D in the non-active portion P2. Therefore, even when the thickness t3 of the diaphragm 36D is constant in the lateral direction of the pressure chamber C, the bending rigidity of the diaphragm 36D in the active portion P1 may be higher than the bending rigidity of the diaphragm 36D in the non-active portion P2. Also, the relation of the neutral axis position ratio described above may be satisfied.

As described above, the composition of the material forming the diaphragm 36D in the active portion P1 is different from the composition of the material forming the diaphragm 36D in the non-active portion P2. Therefore, the Young's modulus of the material forming the diaphragm 36D in the active portion P1 may be higher than the Young's modulus of the material forming the diaphragm 36D in the non-active portion P2.

6. Sixth Embodiment

A sixth embodiment of the present disclosure will be described below. In the embodiment described below, the element having the same operation and function as that in the first embodiment is denoted by the same reference numeral as that used in the description of the first embodiment, and detailed description thereof is omitted as appropriate.

Figure 12:
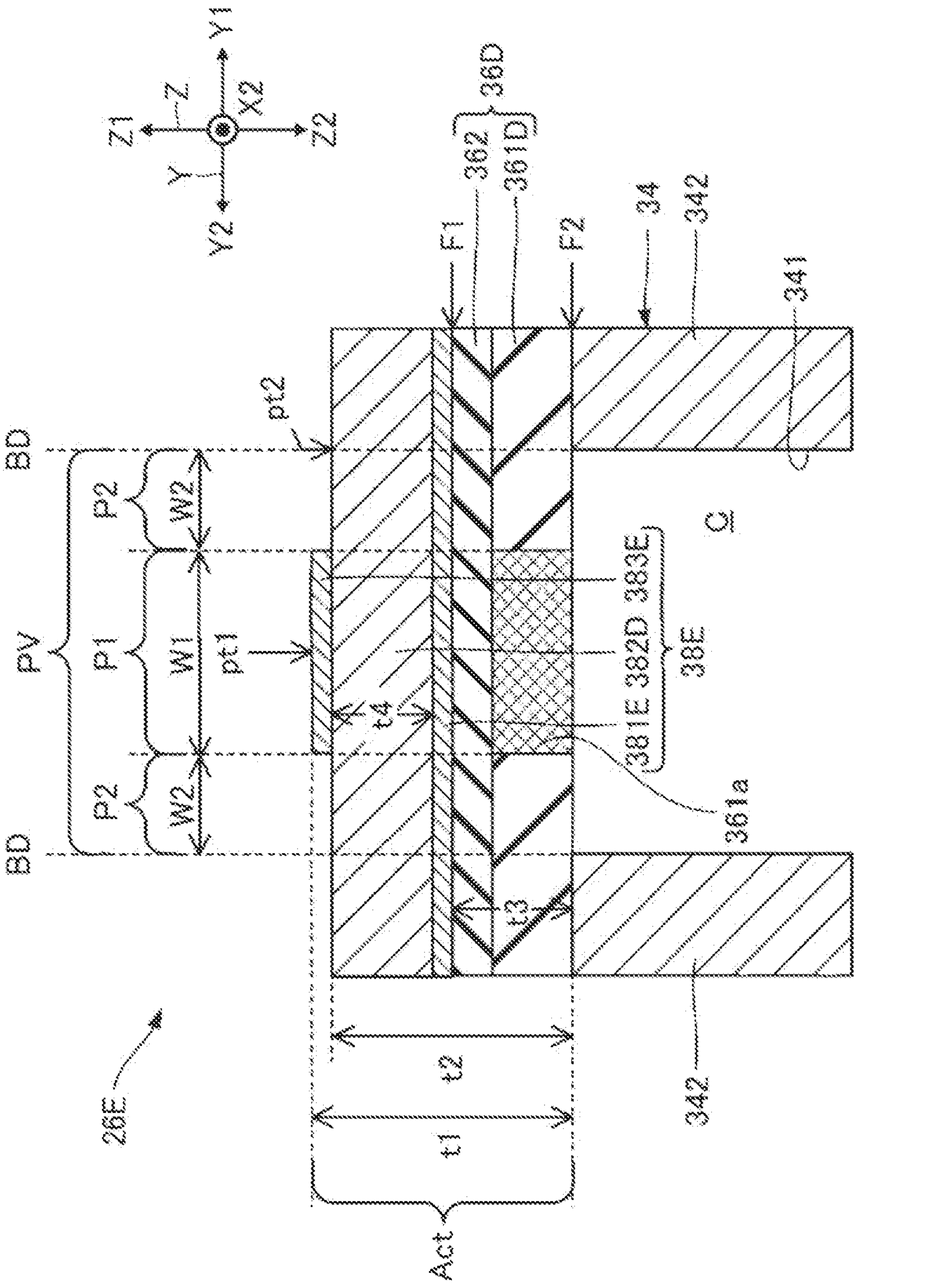
FIG. 12 is a cross-sectional view of a liquid ejecting head according to a sixth embodiment.

FIG. 12 is a cross-sectional view of a liquid ejecting head 26E according to the sixth embodiment. The liquid ejecting head 26E is the same as the liquid ejecting head 26D according to the fifth embodiment described above except that the liquid ejecting head 26E includes a piezoelectric element 38E instead of the piezoelectric element 38D. The piezoelectric element 38E is the same as the piezoelectric element 38D according to the above-described fifth embodiment except that the piezoelectric element 38E includes a first electrode layer 381E and a second electrode layer 383E instead of the first electrode layer 381 and the second electrode layer 383.

The first electrode layer 381E is configured in the same manner as the first electrode layer 381 according to the first embodiment described above except that the first electrode layer 381E is a band-shaped common electrode extending in the direction along the Y axis to be continuous across the piezoelectric elements 38E. The second electrode layer 383E is configured in the same manner as the second electrode layer 383 according to the first embodiment described above except that the second electrode layers 383E are individual electrodes arranged apart from each other for the respective piezoelectric elements 38E.

According to the sixth embodiment, too, the reliability of the liquid ejecting head 26E may be improved as in the first embodiment described above. The same advantageous effect as that of the fifth embodiment described above may be obtained.

7. Modification

The embodiments described above may be modified in various ways. Specific modifications applicable to the above-described embodiments will be described below. Any two or more modifications selected from the description below may be combined as appropriate as long as there is no contradiction to each other.

7-1. Modification 1

In the configuration described according to the above-described embodiment, the piezoelectric layer is interposed between the individual electrode and the common electrode, but is not limited thereto, and a configuration may be such that a piezoelectric layer is interposed between the individual electrodes.

7-2. Modification 2

Each of the embodiments above describes the serial-type liquid ejecting apparatus 100 in which the transport body 242 having the liquid ejecting head 26 mounted thereon is moved back and forth, but the present disclosure may also be applied to a line-type liquid ejecting apparatus in which the nozzles N are distributed over the entire width of the medium 12.

7-3. Modification 3

The liquid ejecting apparatus 100 described in each of the above-described embodiments may be employed in various apparatuses such as facsimile machines and copiers in addition to apparatuses dedicated to printing. The application of the liquid ejecting apparatus according to the present disclosure is not limited to printing. For example, a liquid ejecting apparatus that ejects a solution of a color material is used as a manufacturing apparatus that forms a color filter of a liquid crystal display device. Furthermore, a liquid ejecting apparatus that ejects a solution of a conductive material is used as a manufacturing apparatus that forms wiring and electrodes of a wiring substrate.

What is claimed is:

1. A liquid ejecting head comprising:

a diaphragm including a first surface and a second surface opposite to the first surface;

a piezoelectric element disposed on the first surface; and a partition wall disposed on the second surface to partition a pressure chamber communicating with a nozzle, wherein the piezoelectric element includes a first electrode layer, a piezoelectric layer, and a second electrode layer, the first electrode layer, the piezoelectric layer, and the second electrode layer are laminated in this order on the first surface, the pressure chamber has an elongated shape when viewed in a thickness direction of the diaphragm, in a structure including the diaphragm and the piezoelectric element, an active portion is a portion where the pressure chamber, the first electrode layer, the piezoelectric layer, and the second electrode layer are all overlapped when viewed in the thickness direction of the diaphragm, in the structure, a non-active portion is a portion that is overlapped with the pressure chamber at a position different from the active portion and that is adjacent to the active portion in a lateral direction of the pressure chamber when viewed in the thickness direction of the diaphragm, a first position is a position on an inner side of the active portion when viewed in the thickness direction of the diaphragm, a second position is a position on an inner side of the non-active portion and closest to a boundary between the pressure chamber and the partition wall when viewed in the thickness direction of the diaphragm, and $EI1/EI2 \leq 40$, wherein EI1 is a bending rigidity of the active portion at the first position and EI2 is a bending rigidity of the non-active portion at the second position.

2. The liquid ejecting head according to claim 1, wherein $1 < EI1/EI2$.

3. The liquid ejecting head according to claim 2, wherein $30 < EI1/EI2$.

4. The liquid ejecting head according to claim 1, wherein the non-active portion is located between the active portion and the partition wall when viewed in the thickness direction of the diaphragm.

5. The liquid ejecting head according to claim 1, wherein a thickness of the active portion is larger than a thickness of the non-active portion.

6. The liquid ejecting head according to claim 5, wherein a thickness of a thinnest portion of the diaphragm in the non-active portion is smaller than a thickness of a thinnest portion of the diaphragm in the active portion.

7. The liquid ejecting head according to claim 5, wherein the piezoelectric layer is disposed over both the active portion and the non-active portion and a thickness of a thinnest portion of the piezoelectric layer in the non-active portion is smaller than a thickness of a thinnest portion of the piezoelectric layer in the active portion.

8. The liquid ejecting head according to claim 1, wherein a Young's modulus of a material forming the diaphragm in the active portion is higher than a Young's modulus of a material forming the diaphragm in the non-active portion.

9. The liquid ejecting head according to claim 1, wherein a composition of a material forming the diaphragm in the active portion is different from a composition of a material forming the diaphragm in the non-active portion.

10. The liquid ejecting head according to claim 1, wherein W1/W2≤5, wherein W1 is a width of the active portion along the lateral direction of the pressure chamber and W2 is a width of the non-active portion along the lateral direction of the pressure chamber.

11. The liquid ejecting head according to claim 10, wherein 1≤W1/W2.

12. A liquid ejecting apparatus comprising:

the liquid ejecting head according to claim 1 and a controller that controls driving of the liquid ejecting head.

13. The liquid ejecting head according to claim 1, wherein a thickness of the diaphragm is constant throughout each of the active portion and the non-active portion.

14. The liquid ejecting head according to claim 1, wherein a thickness of the diaphragm in the non-active portion is constant.

15. The liquid ejecting head according to claim 1, wherein a portion of the diaphragm overlaps an entirety of the pressure chamber when viewed in a thickness direction of the diaphragm and a thickness of the portion of the diaphragm is constant.

16. The liquid ejecting head according to claim 1, wherein the non-active portion includes a range with a thickness equal to a thickness at the second position, and the range includes the second position.

* * * * *